United States Patent [19]

Lerner

[11] 3,787,904

[45] Jan. 29, 1974

[54] LIQUID DISPENSING AND METERING DEVICE

[75] Inventor: Nathan B. Lerner, Chicago, Ill.

[73] Assignee: W. Braun Company, Chicago, Ill.

[22] Filed: Sept. 27, 1971

[21] Appl. No.: 184,022

[52] U.S. Cl. .................................................. 4/227
[51] Int. Cl. ............................................. E03d 9/03
[58] Field of Search .. 222/185, 420; 4/227, 228, 222

[56] References Cited
UNITED STATES PATENTS

| | | | |
|---|---|---|---|
| 3,698,021 | 10/1972 | Mack | 4/227 |
| 3,073,488 | 1/1963 | Komter | 4/227 X |
| 2,967,310 | 1/1961 | O'Hare | 4/227 |
| 2,688,754 | 9/1954 | Willits et al. | 222/420 X |

FOREIGN PATENTS OR APPLICATIONS

| | | | |
|---|---|---|---|
| 710,796 | 6/1954 | Great Britain | 4/228 |
| 205,904 | 6/1951 | Great Britain | 4/228 |
| 488,804 | 3/1937 | Great Britain | |

Primary Examiner—Stanley H. Tollberg
Assistant Examiner—Larry Martin
Attorney, Agent, or Firm—Max R. Kraus

[57] ABSTRACT

A liquid dispensing and metering device for automatically and periodically dispensing a predetermined quantity of liquid into a flush tank or the like, which device comprises an integrally formed member having a wall within the neck or discharge opening of the container so that the device does not extend outwardly beyond the neck or discharge opening of the container so as to minimize the overall height of the container, and in which the outlet or discharge end may be covered by a closure cap, said device having an opening in the wall thereof through which the liquid in the container is dispensed in measured amounts.

1 Claim, 5 Drawing Figures

PATENTED JAN 29 1974  3,787,904
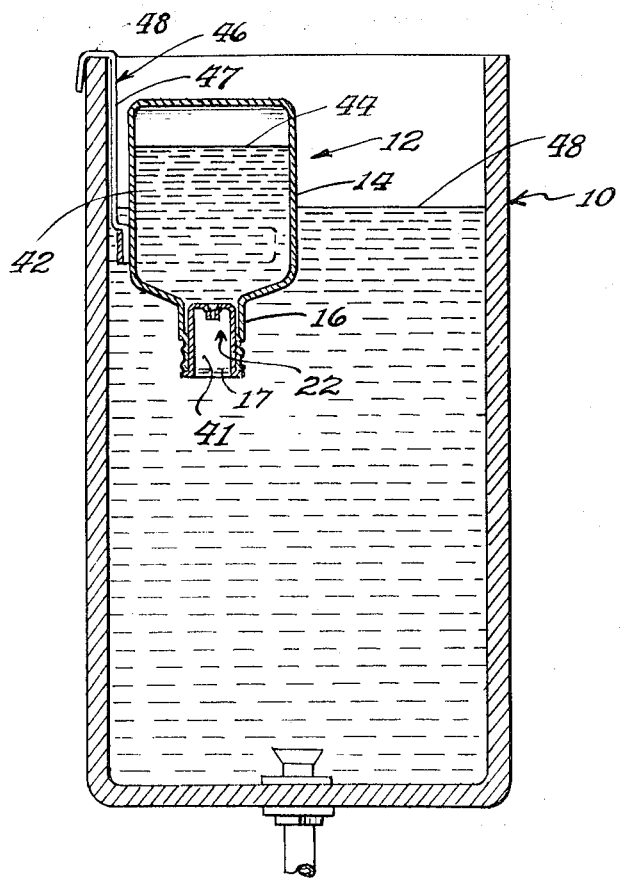
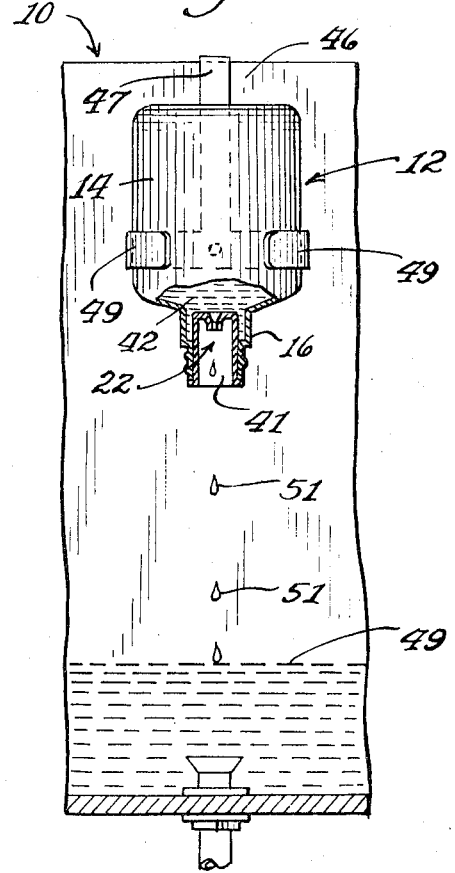
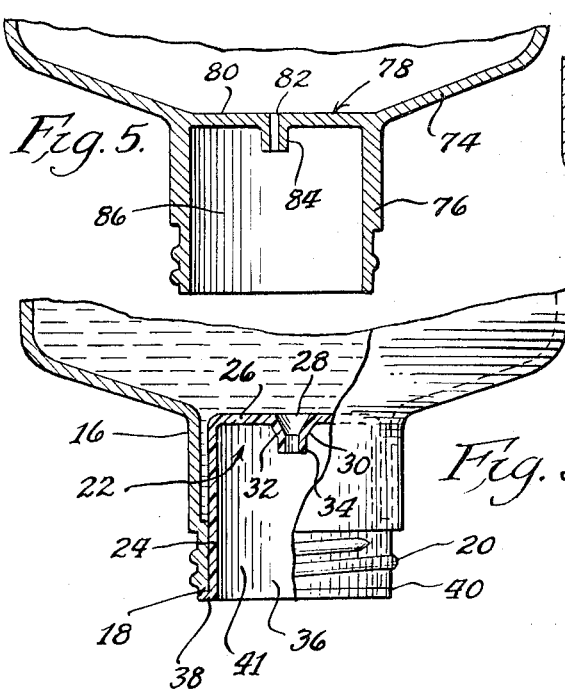
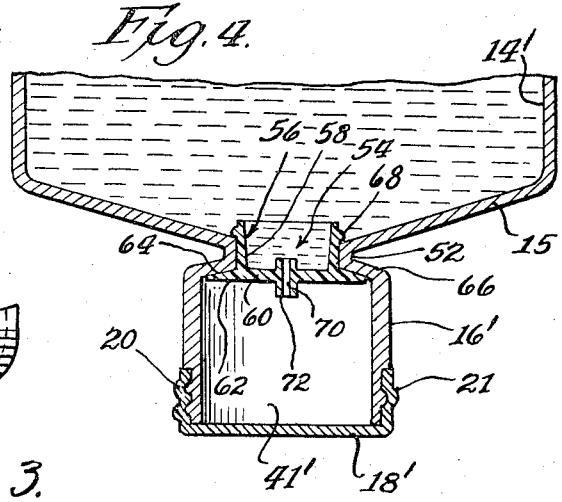
Inventor
Nathan B. Lerner
By Max R. Kraus
Atty.

3,787,904

LIQUID DISPENSING AND METERING DEVICE

BRIEF SUMMARY OF THE INVENTION

An object of this invention is to provide a liquid dispensing and metering device for use in connection with a flush tank for a toilet in which a measured amount of a liquid, such as a liquid detergent, disinfectant, or the like, is automatically discharged into the water in the flush tank upon the dropping of the water level within the tank and before the subsequent rise of the water is completed, and wherein the device is contained either within the container or bottle containing the liquid or an integral part thereof, so that a closure cap closes the container with the device in position ready for use upon removal of the closure cap.

The prior art, such as for example, U.S. Pat. No. 2,688,754 shows a device for dispensing a cleanser in a flush tank, however, the device comprises a plurality of components which are attached to the closure cap of the bottle, with an opening extending through the closure cap and with the device extending exteriorly of the cap and container. A separate closure member would be necessary to close the container.

Prior art U.S. Pat. No. 2,065,181 shows a device which is attached to the closure cap and extends exteriorly of the cap and includes a plurality of components and reciprocable member and float which operate exteriorly of the closure cap.

British Pat. No. 488,804 shows a plurality of parts, such as a nozzle with an internally threaded bore which receives an externally threaded plug having an opening. The nozzle is screwed into a hole in the lid of the container to extend exteriorly thereof, therefore, the device also operates exteriorly thereof.

While all of the foregoing devices are intended to accomplish applicant's broad objective, they are deficient in that they require numerous parts, in contrast to applicant's single integrally formed member. They operate exteriorly of the bottle or container, while applicant's device is within the overall height of the bottle or container and/or can, which permits the closure cap of the bottle or container to close and seal the container with the device therewithin in a conventional manner. Thus, with applicant's device the automatically operated dispensing and metering unit is confined within the height of the bottle or container and can be packaged and shipped in cartons which are of the bottle height. This also permits the bottle or container to be displayed on a standard height store shelf without a waste of space. Also, the bottle may be placed in the flush tank for convenient and immediate operation as soon as the closure cap is removed. The prior art is deficient in the foregoing, as well as in other respects.

BRIEF DESCRIPTION OF THE DRAWINGS

In the drawings:

FIG. 1 is a sectional view showing the invention supported in a conventional toilet flush tank with the level of the liquid in the tank prior to flushing.

FIG. 2 is a view showing the level of the liquid in the tank below the device, as when the toilet is flushed, so that a measured amount of the liquid in the bottle or container is discharged into the flush tank.

FIG. 3 is an enlarged view of the device in the neck of the bottle or container.

FIG. 4 is a sectional view of a modification with the closure cap applied, and

FIG. 5 is a sectional view showing the invention embodied as an integral part of the container.

The conventional flush tank which includes a conventional type of flush system for a toilet is indicated by the numeral 10 and same is automatically refilled up to the desired water level after each flushing operation, as is well understood. The liquid dispenser, generally indicated at 12, comprises a container 14, such as a bottle, can or the like, of the desired capacity, which bottle or can is preferably provided with a reduced neck 16 which provides the outlet opening or mouth or discharge end 18 for the bottle or can. The neck 16 is externally threaded as at 20 to receive a conventional closure cap 21, shown only in FIG. 4, which is internally threaded and is adapted to be secured to the externally threaded neck of the container for closing the mouth 18 of the container, as well as closing the open end of the cup-shaped member 22 forming this invention.

The liquid metering and dispensing device forming this invention, shown in FIGS. 1–3, is an integrally formed generally cup-shaped member, generally indicated at 22, having an annular side wall 24 and an end or separating wall 26, which end or separating wall has a central axial opening 28 bounded by an inwardly extending funnel-shaped tubular member 30, which is best shown in FIG. 3. The funnel-shaped tubular member has a conical portion 32 terminating in a tubular end 34. The funnel-shaped tubular member 30 extends into the interior chamber of the cup-shaped member. The opposite or open end 36 of the device is provided with an annular lip or flange 38 which is adapted to engage the outer edge 40 of the mouth of the neck of the container.

After the bottle or container is filled with the cleansing or disinfecting liquid 42, the device 22 forming this invention is inserted into the neck of the bottle or container so that it extends wholly within the neck, except for the annular lip 38 which rests against the outer edge 40 of the mouth of the neck of the container and limits the inward positioning of the device. With the device thus positioned, the conventional closure cap 21 can be secured to the neck of the bottle or can in the conventional manner and when thus applied the outlet opening or mouth 18 of the neck of the container, as well as the open end 36 of the device will be completely sealed. The overall height of the bottle or can is not increased as the device is wholly confined within the neck of the bottle or can, or within the container, at the outlet end thereof.

The device is molded preferably of a polyethylene material and is integrally formed so that it may be inexpensively produced. There are no operating or moving parts, therefore, the device requires no assembly of components. The device is frictionaly retained within the neck of the bottle or container and adds very little to the cost of the entire unit.

The interior of the cup-shaped member 22 forms a chamber generally indicated at 41, of a desired and predetermined volumetric capacity in relation to the size of the opening 28, to control the quantity of the liquid 42 to be automatically discharged at each discharge period. If desired, the height of the cup-shaped member 22 may be increased from that shown to extend further into the interior of the container, or the diameter may be increased to thereby increase the volumetric capacity of the chamber 41.

The end or separating wall 26 in effect forms a closure for the liquid within the container so that the liquid must pass through the metering opening 28 in order to get into the chamber 41 as the liquid is discharged. The wall 26 is part of the chamber 41 and allows the air in the chamber to be compressed in the chamber as the water in the tank rises. The compressed air can only enter the container through the opening 28.

The device is supported inside the flush tank in any desired manner, however, for the purpose of illustration, the bottle or container is suspended by a hanger bracket 46 which has an elongated member 47 provided at the upper end with a hook 48 to engage over the upper edge of the side wall of the tank. The opposite or lower end extremity of the member carries the laterally disposed and oppositely directed arms 49 between which the bottle or container is tightly held. As shown, the bottle or container 14 containing the liquid 42 to be dispensed is supported in the tank 10 in an inverted position, as shown in FIGS. 1-3. In this position the cup-shaped member 22 is likewise in its inverted position. The container 14 is not completely filled with the liquid to be dispensed and, as indicated in FIG. 1, when in inverted position the top of the liquid would be up to the approximate level indicated in dotted lines at 44.

When the container is inverted the liquid 42 in the container is normally held against discharge by a partial vacuum within the container above the level 44 and there will be no discharge beyond the first few drops. When the flush tank 10 fills with water above the mouth of the device, air is entrapped and compressed in the chamber 41 of the cup-shaped member 22 and a portion of this air is forced into the container 14 through the opening 28 and funnel-shaped member 30, and the air will pass up through the liquid 42 within the container and above the liquid level 44 and thereby reduce the partial vacuum above the liquid in the container and create a pressure against the liquid 42 to effect a discharge automatically through the opening 28 when the water level within the tank lowers below the mouth of the neck of the bottle or container. Thus, when the water in the flush tank drops below the mouth of the device, as shown in FIG. 2, as when the toilet is flushed, a predetermined amount of the liquid 42 will be automatically discharged from the bottle or container into the flush tank.

The level of the water in the flush tank when same is normally filled is as indicated by the numeral 48, thus, the outlet end of the bottle or container 14 and the inverted cup-shaped member 22 is submerged in the water within the tank. However, the cup-shaped member 22 is substantially free of the tank water except for a small amount of water which enters the mouth of the cup-shaped member to approximately the level indicated by the numeral 17. This is very important in order to prevent any of the tank water from getting into the interior of the bottle or container 14 and diluting the contents 42 thereof.

In flushing, the water within the toilet tank drops below the neck of the bottle or container to approximately the level indicated at 49, shown in FIG. 2, and the liquid 42 in the container 14 will be automatically discharged in the form of drops 51, the size of which is determined in the main by the diameter of the opening 28. The amount of liquid 42 discharged from the container or bottle at each period of discharge is dependent on the amount of air forced into the container or bottle 14 above the liquid therein and the amount is determined by the volumetric capacity of the chamber 41 of the inverted cup-shaped member 22. Since the quantity of liquid released at each period of discharge is approximated to the volume of air which is trapped in the chamber 41 of the cup-shaped member 22 and forced into the container 14, and this volume of air is proportional to the size of the chamber 41, it is possible, after first predetermining the desired amount of liquid to be periodically discharged, to form a cup-shaped member of a size having a chamber 41 of the desired volumetric capacity and an opening 28 proportionate thereto. However, the entire unit is confined within the neck of the bottle or container and, if necessary, can extend into the interior of the container so as not to extend the height of the container.

The liquid within the container or bottle is of a sanitizing or detergent character and serves to remove film or the like which normally forms on the interior of the toilet bowl and it thereby maintains the toilet bowl in a sanitary condition.

Since the cup-shaped member 22 is positioned in the neck of the bottle or container and the closure cap is applied to the neck of the bottle or container with the cup therein contained, it will be appreciated that the overall height of the bottle or container can be kept to a minimum by the application of this invention. While the body of the bottle or container is shown as generally rectangular, it can of course be round, or any shape desired. The unit when positioned in the neck of the bottle or container is ready for use when the cap is removed. Since there are no moving parts in connection with the device the cost of fabricating the unit is very inexpensive.

FIG. 4 EMBODIMENT

FIG. 4 shows a modification in which the dispensing and metering device is positioned at the inner end of the neck of the container, with the interior of the neck of the container serving to provide the chamber, similar to 41, of the inverted cup-shaped member 22, as described with respect to FIGS. 1-3.

The container 14' in FIG. 4 has a reduced neck 16' having an outlet end or mouth 18'. The neck is externally threaded as at 20' to receive the closure cap 21. Between the neck 16' and the top 15 of the body of the container there is a reduced annular throat portion 52. The dispensing and metering unit is generally indicated at 54 and comprises a cup-shaped member 56 having an annular side wall 58 and an annular end wall 60, which end wall extends laterally beyond the side wall 58 to form an annular ledge 62 having a tapered top surface 64 complementary to the taper 66 at the inner end of the neck. An annular bead 68 is formed adjacent the open end of the cup-shaped member 56. The end wall 60 has a central opening 70 bounded by a tubular member 72 which extends on opposite sides of the end wall 60. The unit 54 is inserted into the neck of the bottle or container so that the annular side wall 58 passes into the throat 52 of the container, with the annular bead 68 engaging the inside of the bottle adjacent the throat to hold the unit in the position shown in FIG. 4, with the end wall 60 of the cup-shaped member sealed against the inner wall of the neck. The interior of the neck in combination with the unit 54 and particularly the end wall 60 thereof forms a chamber 41' which serves the purpose of the cup-shaped member 22 and the chamber 41 previously described. The operation and function of the FIG. 4 embodiment is similar to that previously described and will not be redescribed.

In the several embodiments shown, the dispensing and metering device is a one-piece device and is molded preferably of polyethylene material and is contained within the neck portion of the container so as not to interfere with the closing thereof by the closure cap 21.

FIG. 5 EMBODIMENT

FIG. 5 shows a modification wherein the device is molded and blown as an integral part of the bottle which is molded preferably of a plastic material. The bottle is indicated by the numeral 74 and the externally threaded neck is indicated by the numeral 76. The device forming the FIG. 5 modification is generally indicated at 78 and includes an annular wall 80 formed as an integral part of the bottle. The wall 80 is at the inner end of the neck and in effect separates the body of the bottle from the neck portion thereof. The wall 80 is provided with a central opening 82 bounded by an inwardly extending tubular portion 84. The wall 80 and the neck 76 defines a chamber generally indicated at 86. The operation of the device in the FIG. 5 embodiment is identical to that previously described.

What is claimed is:

1. A device for automatically and periodically dispensing a predetermined quantity of liquid from a container into a flush tank or the like, with said container supported in the flush tank, with the mouth or discharge end of the container facing downwardly and with said container having a reduced neck portion, said device comprising a single integrally formed member which consists of a cup-shaped member having an annular side wall and a single bottom end wall with a single axial opening in said bottom wall and an inwardly extending short tubular member bounding said axial opening, said short tubular member extending into the interior of the cup-shaped member and facing forwardly towards the direction of the mouth of the cup-shaped member, said tubular member being spaced from said annular side wall, said cup-shaped member forming a single chamber, said tubular member having a relatively small outlet opening into said chamber with the discharge end of the tubular member closely adjacent the end wall and a substantial distance from the mouth of the cup-shaped member so that the water in the flush tank even when the flush tank is filled and the cup-shaped member is below the level of the water in the tank is never in contact with said tank water and said tank water is confined closely adjacent the mouth of the cup-shaped member with an air space therebetween in said chamber, said single bottom end wall and tubular member being integrally formed with said cup-shaped member of a plastic material, an integrally formed annular flange around the mouth of said cup-shaped member to engage the discharge end of the neck of the container, said device positioned in the neck of the container and extending wholly within the neck to permit a closure cap to be secured to the neck of the container with the device frictionally contained in said neck so that the overall height of the container with the device therein is substantially that of the overall height of the container, said single end wall opening communicating axially with the liquid in the container so that the flow from the container is solely axially through said axial opening through which a measured amount of the liquid in the container is discharged into the flush tank opening after each flushing, and a closure cap detachably secured to the neck of the container, with the device contained in said neck to close the container when not in use.

* * * * *